(12) United States Patent
Uchida et al.

(10) Patent No.: US 10,301,094 B2
(45) Date of Patent: May 28, 2019

(54) PRODUCT CONVEYANCE FILM

(71) Applicant: AICELLO CORPORATION, Toyohashi-shi, Aichi (JP)

(72) Inventors: Takashi Uchida, Toyohashi (JP); Tomohiro Niimi, Toyohashi (JP)

(73) Assignee: AICELLO CORPORATION, Toyohashi-Shi (JP)

( * ) Notice: Subject to any disclaimer, the term of this patent is extended or adjusted under 35 U.S.C. 154(b) by 0 days.

(21) Appl. No.: 15/748,137

(22) PCT Filed: Aug. 5, 2016

(86) PCT No.: PCT/JP2016/073206
§ 371 (c)(1),
(2) Date: Jan. 26, 2018

(87) PCT Pub. No.: WO2017/026421
PCT Pub. Date: Feb. 16, 2017

(65) Prior Publication Data
US 2018/0222651 A1  Aug. 9, 2018

(30) Foreign Application Priority Data

Aug. 7, 2015 (JP) ................................. 2015-157662
Aug. 5, 2016 (JP) ................................. 2016-154687

(51) Int. Cl.
*B32B 7/02* (2019.01)
*B65D 75/26* (2006.01)
(Continued)

(52) U.S. Cl.
CPC ................ *B65D 75/26* (2013.01); *B32B 7/02* (2013.01); *B32B 27/32* (2013.01); *B65D 65/40* (2013.01);
(Continued)

(58) Field of Classification Search
CPC .......... B32B 2250/02; B32B 2307/536; B32B 2307/54; B32B 2307/56; B32B 2307/72;
(Continued)

(56) References Cited

U.S. PATENT DOCUMENTS

2011/0244185 A1* 10/2011 Dou .................... B29C 47/0021
428/156

FOREIGN PATENT DOCUMENTS

JP        H8072213 A    3/1996
JP        H8169090 A    7/1996
(Continued)

OTHER PUBLICATIONS

Notification Concerning Transmittal of International Preliminary Report on Patentability (PCT/IB326) and Notification of Transmittal of Translation of the International Preliminary Report on Patentability (PCT/IB/338) dated Feb. 22, 2018, with International Preliminary Report on Patentability (PCT/IB/373) and Written Opinion of the International Searching Authority (PCT/ISA/237), for corresponding international application PCT/JP2016/073206.
(Continued)

*Primary Examiner* — Lawrence D Ferguson
(74) *Attorney, Agent, or Firm* — Law Office of Katsuhiro Arai

(57) ABSTRACT

An object to be achieved is to provide a product conveyance film, the generation of powder or other foreign matter from which is suppressed under vibration during transport. As a means for achieving the object, a product conveyance film is provided which is placed between a product and a packing material in which the product is enclosed, wherein such product conveyance film is characterized in that the maximum static friction force on its face on the product side is greater than the dynamic friction force on its face on the packing-material side and the difference between the two
(Continued)

forces is 0.30 N or more, and that the dynamic friction force on the face on the packing-material side is 0.80 N or less.

16 Claims, 1 Drawing Sheet

(51) Int. Cl.
*B65D 65/40* (2006.01)
*B32B 27/32* (2006.01)
*B65D 85/68* (2006.01)

(52) U.S. Cl.
CPC ..... *B32B 2250/02* (2013.01); *B32B 2307/536* (2013.01); *B32B 2307/54* (2013.01); *B32B 2307/56* (2013.01); *B32B 2307/72* (2013.01); *B32B 2307/746* (2013.01); *B32B 2323/043* (2013.01); *B32B 2323/046* (2013.01); *B32B 2323/10* (2013.01); *B32B 2553/00* (2013.01); *B65D 85/68* (2013.01)

(58) Field of Classification Search
CPC ........ B32B 2307/746; B32B 2323/043; B32B 2323/046; B32B 2323/10; B32B 2553/00; B32B 27/32; B32B 7/02; B65D 65/40; B65D 75/26; B65D 85/68
See application file for complete search history.

(56) References Cited

FOREIGN PATENT DOCUMENTS

| | | |
|---|---|---|
| JP | H8187822 A | 7/1996 |
| JP | 2002205761 A | 7/2002 |
| JP | 2003221036 A | 8/2003 |
| JP | 2011157127 A | 8/2011 |

OTHER PUBLICATIONS

International Search Report (ISR) dated Nov. 1, 2016, issued for International application No. PCT/JP2016/073206.
Notification of Reasons for Refusal issued by Japanese Patent Office, dated Sep. 6, 2016, for counterpart Japanese application No. 2016-154687.

\* cited by examiner

[FIG. 1]
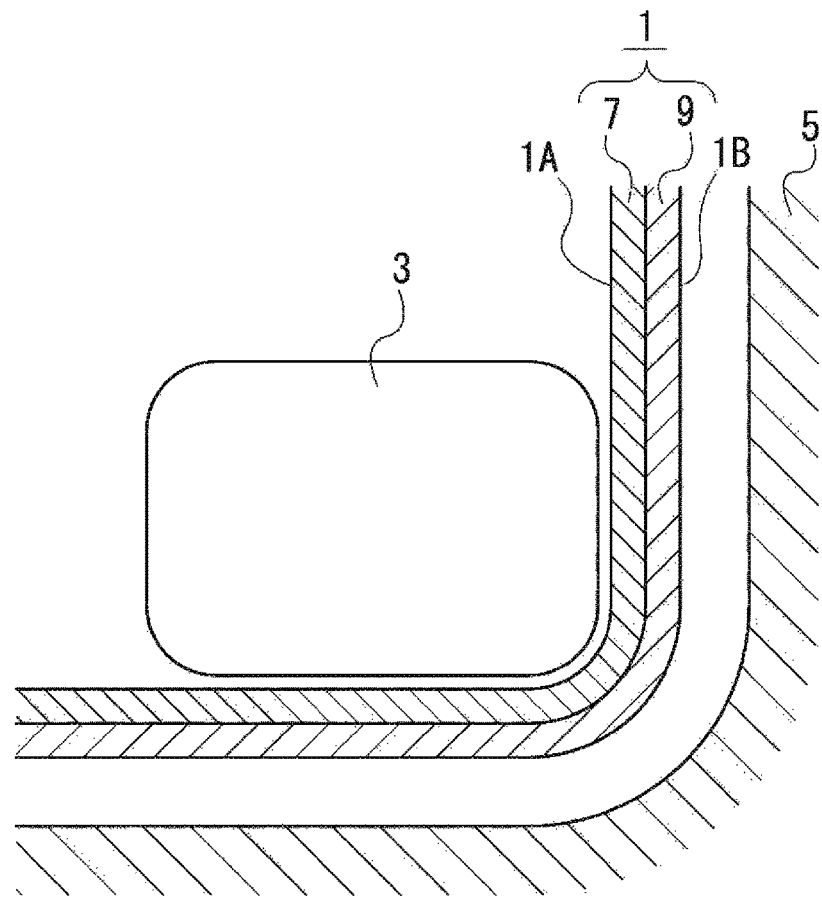
[FIG. 2]
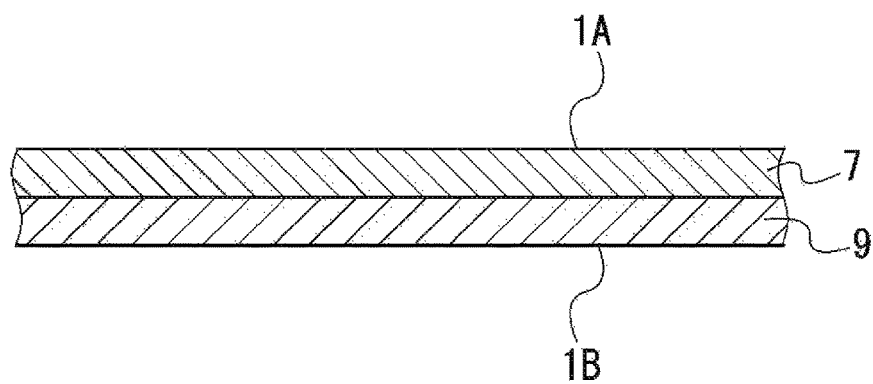

PRODUCT CONVEYANCE FILM

This application is the U.S. National Phase under 35 U.S.C. § 371 of International Application PCT/JP2016/073206, filed Aug. 5, 2016, which claims priority to Japanese Patent Application No. 2015-157662, filed Aug. 7, 2015, and Japanese Patent Application No. 2016-154687, filed Aug. 5, 2016. The International Application was published under PCT Article 21(2) in a language other than English.

TECHNICAL FIELD

The present invention relates to a product conveyance film. More specifically, it relates to a product conveyance film which is used together with dunnage or other packing materials to transport products.

BACKGROUND ART

When transporting products on a vehicle or vessel, by rail, etc., normally the products are placed on or packed by packing materials (Patent Literature 1, Patent Literature 2).

In this case, vibration, etc., occurring during transport may cause friction where the products contact the packing material, and the dunnage may be shaved off into small pieces as a result.

There are concerns that problems will be caused by these scrapings attaching to the products. When one such product is joined to another such product in a subsequent step, for example, presence of scrapings on joining surfaces may cause joining failure. Additionally, when the products are brought into a cleanroom, the environment in the cleanroom may be contaminated.

If this is the case, the attached scrapings must be carefully removed, which could require a separate step after the transport for washing the products again or blowing the scrapings away using air, etc., and the manufacturability may drop significantly as a result.

One countermeasure to the foregoing situations is a method involving changing the dunnage shape to one that prevents scrapings from generating easily; however, such method lacks general utility because a dunnage structure must be designed that matches the shape of each product (Patent Literature 3).

Another idea is to lay a film between the products and the dunnage to prevent the dunnage from being shaved off.

However, doing so presents a possibility that, this time, the film will be shaved off and scrapings from the film will attach to the products, in which case a step for washing or otherwise cleaning the products will be required after transport.

In addition, when transported products are used in assembly, for example, sometimes the products are not given a traditional cleaning step. Such practice has been associated with reports of the assembled products malfunctioning due to introduction of scrapings, etc. In particular, problems like this are of concern when the products are heavy.

BACKGROUND ART LITERATURE

Patent Literature

Patent Literature 1: Japanese Patent Laid-open No. 2002-205761
Patent Literature 2: Japanese Patent Laid-open No. 2003-221036
Patent Literature 3: Japanese Patent Laid-open No. 2011-157127

SUMMARY OF THE INVENTION

Problems to be Solved by the Invention

The present invention was made to solve the aforementioned problems, and its object is to provide a product conveyance film, the generation of scrapings from which is suppressed under vibration during transport.

Means for Solving the Problems

In light of the prior art mentioned above, the inventors for the present invention conducted multiple studies in earnest, and consequently developed a new product conveyance film. And, the inventors discovered that this new product conveyance film does not generate scrapings easily due to vibration during transport and that it is suitable for transporting products. The means suitable for achieving the aforementioned object, etc., are each explained below in different sections.

It should be noted that, under the present invention, "Martens hardness" represents the Martens hardness HM measured in accordance with the instrumented indentation test under ISO 14577, "yield strength when stretched by 1%" represents the value measured in accordance with JIS K7127, and "maximum static friction force" and "dynamic friction force" represent the values measured in accordance with the friction coefficient test methods for plastic films and sheets under JIS K7125.

It should also be noted that, among embodiments of the present invention, one corresponding to (1) through (5) below is referred to as "Embodiment 1 of the present invention," while the other corresponding to (6) through (11) is referred to as "Embodiment 2 of the present invention."

The present invention has the following constitutions.

(1) A product conveyance film placed between a product and a packing material in which the product is enclosed, wherein such product conveyance film is characterized in that the maximum static friction force on its face on the product side is greater than the dynamic friction force on its face on the packing-material side and the difference between the two forces is 0.30 N or more, and the dynamic friction force on the face on the packing-material side is 0.80 N or less.

(2) A product conveyance film according to (1), characterized in that such product conveyance film comprises at least two layers, and the Martens hardness of the layer on the product side is 50 N/mm² or less.

(3) A product conveyance film according to (1) or (2), characterized in that such product conveyance film comprises at least two layers, and its yield strength when stretched by 1% is in a range of 0.5 to 12.0 N.

(4) A product conveyance film according to any one of (1) through (3), characterized in that such product conveyance film comprises at least two layers, and a slip agent is added to the layer on the packing-material side.

(5) A product conveyance film according to any one of (1) through (4), characterized in that virtually no tackifier is added to the layer on the product side of such product conveyance film.

(6) A product conveyance film, characterized in that the Martens hardness of one face is 50 N/mm² or less, the dynamic friction coefficient of the other face is 0.40 or less, and the 1% yield strength of the film is in a range of 0.5 to 12.0 N.
(7) A product conveyance film, characterized in that the Martens hardness of one face is in a range of 4 to 25 N/mm$^2$, the dynamic friction coefficient of the other face is in a range of 0.10 to 0.20, and the 1% yield strength of the film is in a range of 1.5 to 10.0 N.
(8) A product conveyance film according to (6) or (7), characterized by comprising at least two layers.
(9) A product conveyance film according to any one of (6) through (8), characterized in that virtually no tackifier is added to the layer on the one face side of such product conveyance film.
(10) A product conveyance film according to any one of (6) through (9), characterized in that the maximum static friction force on one face is greater than the dynamic friction force on the other face, and the difference between the two forces is 0.30 N or more.
(11) A product conveyance film according to any one of (6) through (10), characterized in that it is placed between a product of 0.05 kg/cm$^2$ or more in contact pressure and a packing material in which the product is enclosed, and one face is placed on the product side, while the other face is placed on the packing-material side.

Effects of the Invention

The product conveyance film proposed by the present invention is placed between a product and a packing material in which the product is enclosed.

In Embodiment 1 of the present invention, the product conveyance film proposed by the present invention is characterized in that the maximum static friction force on the face on the product side is greater than the dynamic friction force on the face on the packing-material side. The product side of this film moves easily by following the product, while the packing-material side of the film slips on the packing material, thereby suppressing scraping of the film as a result of the product rubbing against the film.

Additionally, this slipping allows the vibration energy to be diffused. Accordingly, scraping and damage of the film itself and the like can be suppressed.

Additionally, the dynamic friction force on the face on the packing-material side is 0.80 N or less, which makes it particularly difficult for scrapings and other foreign matter to generate due to vibration during transport.

Additionally, when the Martens hardness of the face on the product side is 50 N/mm$^2$ or less, flexibility is added to the film surface and therefore the film follows movement of the product, which makes it difficult for the product to rub against the film.

Additionally, when the 1% yield strength of the film is in a range of 0.5 to 12 N, a certain level of rigidity is added to the film and therefore those problems that would occur specifically when the film loses its ability to follow movement of the product because the rigidity of the film is too high, are suppressed. To be specific, a phenomenon where the product rubs on the film and thus shaves off the film near the surface to cause scrapings to generate, is suppressed.

Additionally, the aforementioned condition also suppresses those problems that would occur specifically when the rigidity of the film is too low. To be specific, drop in elastic recovery property is suppressed. More specifically, when the rigidity of the film is too low, the film does follow vibration of the product, but it becomes vulnerable to plastic deformation and may undergo material failure. When this happens, small pieces of broken materials generate easily from the point of material failure. When the yield strength is within the aforementioned range, such phenomena and the like are suppressed.

Additionally, when the product conveyance film is constituted by at least two layers and a slip agent is added to the layer on the packing-material side, the packing-material side of this film slips particularly easily against the packing material. As a result, scraping, damage, etc., on the packing-material side of the film are prevented in an effective manner.

Additionally, when virtually no tackifier is added to the layer on the product side of the product conveyance film, foreign matter that would have derived from such additive hardly attach to the product.

In Embodiment 2 of the present invention, when the product is relatively heavy and its contact pressure is 0.05 kg/cm$^2$ or more, the Martens hardness of the face on the product side of the product conveyance film is adjusted to 50 N/mm$^2$ or less, or specifically the face on the product side is formed as a moderately flexible face, so that when the product is placed on top, this face follows the shape of the product and deforms or sinks accordingly, thereby allowing the bottom face of the heavy product to adhere to the face on the product side of the product conveyance film and the two to move as one.

On the other hand, the face on the packing-material side of the product conveyance film has a propensity to slip because its dynamic friction coefficient is 0.40 or less. Accordingly, the heavy product adheres to the face on the product side of the film proposed by the present invention so that the product, and the film proposed by the present invention, can move on the packing material face by slipping as one.

In addition, the 1% yield strength of the film proposed by the present invention is in a range of 0.5 to 12 N, which means that, even when a heavy product is placed on it and transported on a vehicle, etc., the film proposed by the present invention will not itself suffer damage.

BRIEF DESCRIPTION OF THE DRAWINGS

The present invention is explained further based on detailed descriptions below, by citing non-limited examples of typical embodiments of the present invention and referring to the multiple drawings referenced herein.

FIG. 1 An explanation drawing showing a condition in which a product conveyance film is used.

FIG. 2 An explanation drawing showing a product conveyance film.

DESCRIPTION OF THE SYMBOLS

1: Product conveyance film
1A: Face on product side
1B: Face on packing-material side
3: Product
5: Packing material
7: Layer on product side
9: Layer on packing-material side

MODE FOR CARRYING OUT THE INVENTION

The matters presented herein are illustrative in nature or used to illustrate embodiments of the present invention, and are mentioned for the purpose of providing explanations that are likely to help understand the principles and conceptual characteristics of the present invention in the most effective and effortless manner. In this point, the intent here is not to describe the structural details of the present invention more than necessary to gain a fundamental understanding of the present invention; instead, the intent is, by explaining the embodiments in combination with the drawings, to clearly show to those skilled in the art how several modes of the present invention are embodied in reality.

Embodiments of the present invention are explained below in detail.

[Product Conveyance Film]

The product conveyance film (1) in this embodiment is placed between a product (3) to be transported and a packing material (5) in which the product (3) is enclosed.

And, the film (1) is characterized in that the maximum static friction force on its face on the product side (1A) is greater than the dynamic friction force on the face on the packing-material side (1B).

The product (3) is not limited in any way, and may be any of various metal parts, for example, and more specifically it may be an engine block, engine head, engine housing, crank, connecting rod, driveshaft, or other vehicle parts. Also, the size, shape, mass, etc., of the product (3) are not limited in any way, either, and any size, shape, mass, etc., may be selected as deemed appropriate according to the purpose, etc.

The packing material (5) in which the product (3) is enclosed is not limited in any way, and may be a dunnage, plastic box, cardboard box, returnable box, etc., which has been formed according to the shape and size of the product, for example. Normally it has no buffer layer inside, and its internal surface is not given or does not have any treatment or member to increase the friction coefficient. Normally the internal surface is formed by a molded or assembled metal, resin, paper, coating paper, wood, etc., which remains exposed or is painted.

The mode in which the film (1) is used is not limited in any way, and any mode may be selected as deemed appropriate according to the purpose, etc. For example, the film (1) may be inserted, in the form of a sheet, between the product (3) and the packing material (5).

Additionally, the product (3) may be wrapped with the film (1) and then enclosed in the packing material (5) in this state. It should be noted that, in this case, the film (1) may be processed into a bag shape beforehand.

In this embodiment according to Embodiment 1 of the present invention, the dynamic friction force on the face on the packing-material side (1B) of the film (1) must be 0.80 N or less and it must also be lower by at least 0.30 N than the maximum static friction force on the face on the product side (1A).

The dynamic friction force on the face on the packing-material side is 0.80 N or less, where preferably it is 0.50 N or less, and more preferably it is 0.40 N or less (normally the dynamic friction force is 0.001 N or more).

Additionally, the value calculated by subtracting the dynamic friction force on the face on the packing-material side from the maximum static friction force on the face on the product side is 0.30 N or more, where preferably it is 0.50 N or more, and more preferably it is 0.60 N or more. However, the upper limit of the value calculated by subtracting the dynamic friction force on the face on the packing-material side from the maximum static friction force on the face on the product side is 2.0 N.

When the dynamic friction force on the face on the packing-material side, and the difference between the maximum static friction force on the face on the product side and the dynamic friction force on the face on the packing-material side, are within the aforementioned ranges, respectively, then attachment of powder and other foreign matter to the product due to vibration during transport is suppressed effectively.

Particularly in Embodiment 2 of the present invention, the Martens hardness of the face on the product side (this face may be hereinafter referred to as "one face") is 50 N/mm$^2$ or less, the dynamic friction coefficient of the face on the packing-material side (this face may be hereinafter referred to as "the other face") is preferably 0.40 or less, or more preferably 0.30 or less, or most preferably 0.20 or less, and preferably the 1% yield strength of the product conveyance film is in a range of 0.5 to 12 N, particularly when the product to be transported is heavy and its contact pressure is 0.05 kg/cm$^2$ or more.

In particular, adjusting the dynamic friction coefficient this way ensures the heavy product and the film proposed by the present invention will slip on the inner face of the packing material when forces are applied, due to vibration during transport, etc., to move the heavy product and the film as one on the inner face of the packing material. As a result, the inner face and outer face of the film will not be scratched or shaved off.

Furthermore, when the Martens hardness of one face is in a range of 4 to 25 N/mm$^2$, the dynamic friction coefficient of the other face is in a range of 0.10 to 0.20, and the 1% yield strength is in a range of 1.5 to 10.0 N, the film will not be shaved off even when a heavy product weighing more than 30 kg is placed on it and greater vibration is applied to it. If any one of these requirements is not met, however, the film will be shaved off after a smaller number of vibrations when put through a vibration test with such heavy product placed on it.

One common aspect of Embodiments 1 and 2 of the present invention is that the thickness of the product conveyance film (1) is not limited in any way. From the viewpoint of making the film (1) less vulnerable to scraping, the thickness is preferably in a range of 10 to 200 µm, or more preferably in a range of 30 to 200 µm, or most preferably in a range of 60 to 200 µm. Additionally, keeping the thickness in these ranges is expected to make the film (1) itself strong enough to withstand fracture due to vibration energy.

Both faces of the product conveyance film (1) proposed by the present invention serve as outermost layer surfaces, and no other layer lacking the properties specified under the present invention may be provided on either face.

The 1% yield strength of the product conveyance film (1) is preferably in a range of 0.5 to 12 N, or more preferably in a range of 1.0 to 11 N, or most preferably in a range of 1.5 to 10 N.

When the 1% yield strength is within these ranges, elastic recovery property is added to the film, which effectively prevents generation of foreign matter caused by tearing or damage of the film caused by stretching due to vibration during transport. In addition, a certain level of rigidity is added to the film, which effectively prevents generation of foreign matter caused by the product rubbing on the film due to vibration during transport.

The product conveyance film (1) may be constituted by a single layer, but preferably it is constituted by at least two layers. This is because, when the film is constituted by at least two layers, the properties of its face on the product side (1A) and the properties of its face on the packing-material side (1B) can be adjusted to optimal ranges with relative ease.

In particular, constituting the film with at least two layers allows for relatively easy adjustment of the Martens hardness of its face on the product side (1A) and the dynamic friction coefficient of its face on the packing-material side (1B).

When the product conveyance film (1) has at least two layers, the two layers it has are as follows. That is, it has a layer on the product side (7) and a layer on the packing-material side (9). It should be noted that another layer may be present between these two layers.

However, particularly when the product is heavy and the product conveyance film has a Martens hardness of 50 N/mm$^2$ or less for the face on the product side, a dynamic friction coefficient of 0.40 or less for the face on the packing-material side, and a 1% yield strength of the film in a range of 0.5 to 12 N, and if a layer of porous structure to absorb impact is provided between the two or more layers, then it is necessary not to impair the effects of the present invention. When a layer of porous structure to absorb impact is provided on at least one of the outer faces of the film, then this layer must have the characteristics specified under the present invention.

Additionally, when a layer made of flexible porous material, for example, is provided between the layer on the packing-material side constituting the other face, and the packing material, then the layer on the packing-material side cannot slip against the packing material when vibration is applied during use and the effects of the present invention may not be demonstrated.

Particularly in Embodiment 2 of the present invention, if the product conveyance film (1) is constituted by at least two layers, the Martens hardness of the layer on the product side (7) is preferably 50 N/mm$^2$ or less, or more preferably in a range of 3 to 47 N/mm$^2$, or most preferably in a range of 4 to 25 N/mm$^2$. When the Martens hardness is within these ranges, the layer on the product side (7) follows movement of the product (3) and the layer on the packing-material side (9) rubs against the packing material (5) preferentially, thereby suppressing scraping of the layer on the product side (7).

This means that, when the Martens hardness is within these ranges, the product (3) does not slip easily against the product conveyance film (1), and the following capability of the layer on the product side (7) to follow movement of the product (3) becomes favorable as a result.

Furthermore, when the Martens hardness is within these ranges, the product conveyance film (1) becomes less likely to tear.

[Product Side]

In Embodiment 1 of the present invention, the resin that constitutes the layer on the product side (7) is selected in such a way that the maximum static friction force on the face on the product side (1A) becomes greater than the dynamic friction force on the face on the packing-material side (1B) and that the difference between the two forces is 0.30 N or more, and any of a wide range of resins may be used.

Additionally, in Embodiment 2 of the present invention, particularly when the product is heavy, any of the materials mentioned below may be selected and used so that the Martens hardness of the face on the product side becomes 50 N/mm$^2$ or less. It should be noted that, here, there is no need to limit the friction coefficient or friction force on the face on the product side in any way.

The resin that constitutes such layer on the product side may be polyolefin resins, etc., for example. Among different types of polyolefin resins, an olefin elastomer or olefin plastomer is used in a favorable manner.

This "polyolefin resin" is an olefin homopolymer and/or a copolymer using an olefin as a monomer.

The density of the polyolefin resin is defined in a range of 0.860 to 0.970 g/cm$^3$; within this range, however, a more preferable range is 0.860 to 0.915 g/cm$^3$. In addition, the MFR (measured under a load of 2.16 kg at 190° C. or 230° C. in accordance with ASTM D1238) of the polyolefin resin, although not limited in any way, is preferably in a range of 0.01 to 150 g/10 min, or more preferably in a range of 0.05 to 50 g/10 min, or most preferably in a range of 0.1 to 20 g/10 min.

The olefin (olefin monomer) that constitutes the polyolefin resin may be ethylene, propylene, 1-butene, 3-methyl-1-butene, 1-pentene, 3-methyl-1-pentene, 4-methyl-1-pentene, 1-hexene, 1-octene, or the like.

Accordingly, the polyolefin resin may be an ethylene polymer, propylene polymer, 1-butene polymer, 1-hexene polymer, 4-methyl-1-pentene polymer, or the like. Any one of these types of polymers may be used alone, or two or more types may be combined. In other words, the polyolefin resin may be a mixture of various polymers.

Among the above, the ethylene polymer may be an ethylene homopolymer (polyethylene) or a copolymer of ethylene and other monomer (ethylene copolymer). The ethylene homopolymer may be a low-density polyethylene (LDPE), linear low-density polyethylene (L-LDPE), medium-density polyethylene (MDPE), high-density polyethylene (HDPE), or ultra-high molecular weight polyethylene (UHMWPE), for example.

In addition, the ethylene copolymer may be an ethylene-propylene copolymer, ethylene-1-butene copolymer, ethylene-1-pentene copolymer, ethylene-1-hexene copolymer, ethylene-1-octene copolymer, ethylene-4-methyl-1-pentene copolymer, or the like.

It should be noted that, although the ethylene units (constitutional units derived from ethylene) contained in the ethylene copolymer only need be greater than 50% of all constitutional units (normally 99.999% or less), they may account for 80 to 99.999%, or 90 to 99.995%, or more narrowly 99.0 to 99.990%, of all constitutional units, for example.

Additionally, the propylene polymer may be a propylene homopolymer (polypropylene) or a copolymer of propylene and other monomer (propylene copolymer). The propylene copolymer may be a propylene-ethylene copolymer, propylene-1-butene copolymer, propylene-1-pentene copolymer, propylene-1-octene copolymer, or the like.

It should be noted that, although the propylene units (constitutional units derived from propylene) contained in the propylene copolymer only need be 50% or greater of all constitutional units (normally 99.999% or less), they may account for 80 to 99.999%, or 90 to 99.995%, or more narrowly 99.0 to 99.990%, of all constitutional units, for example.

Additionally, the polyolefin resin may contain constitutional units derived from non-olefin monomers, to the extent that the object of the present invention is not impaired. Examples of non-olefin monomers include unsaturated carboxylic acids (acrylic acid, methacrylic acid, etc.), unsaturated carboxylate esters (methyl acrylate, ethyl acrylate, butyl acrylate, methyl methacrylate, ethyl methacrylate, butyl methacrylate, dimethyl maleate, diethyl maleate, etc.), vinyl esters (vinyl acetates, vinyl propionate, fumaric acid, maleic anhydride, maleic monoester, etc.), and the like. Any one of these types of monomers may be used alone or two or more types may be combined.

It should be noted that, preferably the constitutional units derived from non-olefin monomers, if any, contained in the polyolefin polymer are no more than 1% of all constitutional units (normally 0.001% or more). For example, these constitutional units may account for 0.001 to 0.8%, or 0.005 to 0.5%, or more narrowly 0.01 to 0.1%, of all constitutional units.

The weight-average molecular weight of the polyolefin resin is not limited in any way. For example, it is preferably 50000 or more, or more preferably 60000 or more, and the upper limit is preferably 1000000 or less, or more preferably 600000 or less.

It should be noted that, if multiple polyolefin resins are used, the weight-average molecular weight of the polyolefin resin refers to the value measured for each polyolefin resin.

It should also be noted that several types of polyolefins, each having a different weight-average molecular weight, may be mixed and used as a polyolefin resin.

In this embodiment, the resin that constitutes the layer on the product side (7), if it uses a polyolefin resin, is preferably an ethylene polymer or propylene polymer, or more preferably an ethylene polymer, or most preferably a linear low-density polyethylene (L-LDPE).

To be more specific, DOWLEX (manufactured by Dow Chemical), ATTANE (manufactured by Dow Chemical), Sumikathene L (manufactured by Sumitomo Chemical), NIPOLON L (manufactured by Tosoh), NIPOLON Z (manufactured by Tosoh), HI-ZEX (manufactured by Prime Polymer), NEO-ZEX (manufactured by Prime Polymer), ULTZEX (manufactured by Prime Polymer), NOVATEC (manufactured by Japan Polyethylene), HARMOREX (manufactured by Japan Polyethylene), Enable (manufactured by Exxon Mobil), Exceed (manufactured by Exxon Mobil), etc., may be used, for example.

The "olefin elastomer" is an α-olefin polymer with 2 to 20 carbon atoms, or a copolymer of such α-olefin polymers. The density of the olefin elastomer is not limited in any way, but it is preferably 0.900 g/cm$^3$ or less, or more preferably in a range of 0.860 to 0.900 g/cm$^3$. In addition, the MFR (measured under a load of 2.16 kg at 190° C. or 230° C. in accordance with ASTM D1238) of the olefin elastomer, although not limited in any way, is preferably in a range of 0.001 to 150 g/10 min, or more preferably in a range of 0.05 to 50 g/10 min, or most preferably in a range of 0.1 to 20 g/10 min. It should be noted that preferably the olefin elastomer either has a crystallinity, as measured by the X-ray diffraction method, of less than 30%, or it is non-crystalline.

The aforementioned α-olefin with 2 to 20 carbon atoms may be, for example, ethylene, propylene, 1-butene, 1-pentene, 1-hexene, 4-methyl-1-pentene, 1-octene, 1-decene, or a mixture thereof. Among these, an α-olefin with 2 to 10 carbon atoms is preferred, where, in particular, a combination of propylene or ethylene with 1-butene, 1-pentene, 1-hexene, 4-methyl-1-pentene, 1-octene, or 1-decene is preferred.

The olefin elastomer may contain repeated units derived from the monomers listed below, to the extent that its characteristics are not impaired.

For example, the component units that are permitted to be contained in the olefin elastomer include component units derived from 1,4-hexadiene, 1,6-octadiene, 2-methyl-1,5-hexadiene, and other chain non-conjugated diene, as well as cyclohexadiene, dicyclopentadiene, methyl tetrahydroindene, 5-vinyl norbornene, 5-ethylidene-2-norbornene, and other diene compounds. Any one diene compound may be used alone or two or more diene compounds may be combined.

To be specific, a polypropylene elastomer or polyethylene elastomer is used favorably for the olefin elastomer.

To be more specific, TAFMER (manufactured by Mitsui Chemicals), TAFTHREN (manufactured by Sumitomo Chemical), ESPRENE SPO (manufactured by Sumitomo Chemical), WELNEX (manufactured by Japan Polypropylene), PRIME TPO (manufactured by Prime Polymer), Catalloy (manufactured by SunAllomer), THERMORUN (manufactured by Mitsubishi Chemical), Vistamaxx (manufactured by Exxon Mobil), NEWCON (manufactured by Japan Polypropylene), INFUSE (manufactured by Dow Chemical), ENGAGE (manufactured by Dow Chemical), VERSIFY (manufactured by Dow Chemical), ESPOLEX TPE (manufactured by Sumitomo Chemical), KERNEL (manufactured by Japan Polyethylene), etc., may be used, for example.

The "olefin plastomer" is an α-olefin polymer with 2 to 20 carbon atoms, or a copolymer of such α-olefin polymers, and exhibits properties in between those of a plastic that undergoes plastic deformation and those of an elastomer that undergoes elastic deformation. In general, the density of the olefin plastomer is defined in a range of 0.870 to 0.915 g/cm$^3$; within this range, however, a more preferable range is 0.880 to 0.915 g/cm$^3$. In addition, the MFR (measured under a load of 2.16 kg at 190° C. or 230° C. in accordance with ASTM D1238) of the olefin plastomer, although not limited in any way, is preferably in a range of 0.001 to 150 g/10 min, or more preferably in a range of 0.05 to 50 g/10 min, or most preferably in a range of 0.1 to 20 g/10 min.

The olefin plastomer is an α-olefin homopolymer and/or a copolymer using an α-olefin as a monomer.

The α-olefin (olefin monomer) that constitutes the olefin plastomer includes ethylene, propylene, 1-butene, 3-methyl-1-butene, 1-pentene, 3-methyl-1-pentene, 4-methyl-1-pentene, 1-hexene, 1-octene, and the like.

Accordingly, the olefin plastomer may be an ethylene polymer, ethylene-1-butene copolymer, ethylene-1-hexene copolymer, ethylene-4-methyl pentene copolymer, ethylene-1-octene copolymer, or the like. Any one of these types of polymers may be used alone or two or more types may be combined. In other words, the olefin plastomer may be a mixture of various polymers.

Among the above, the ethylene polymer may be an ethylene homopolymer (polyethylene) or a copolymer of ethylene and other monomer (ethylene copolymer). The ethylene homopolymer may be a very-low-density polyethylene (VLDPE) or linear low-density polyethylene (L-LDPE), for example.

In addition, the ethylene copolymer may be an ethylene-propylene copolymer, ethylene-1-butene copolymer, ethylene-1-pentene copolymer, ethylene-1-hexene copolymer, ethylene-1-octene copolymer, ethylene-4-methyl-1-pentene copolymer, or the like.

It should be noted that, although the ethylene units (constitutional units derived from ethylene) contained in the ethylene copolymer only need be greater than 50% of all constitutional units (normally 99.999% or less), they may account for 80 to 99.999%, or 90 to 99.995%, or more narrowly 99.0 to 99.990%, of all constitutional units, for example.

To be specific, a polyethylene plastomer is used favorably for the olefin plastomer, for example. To be more specific, AFFINITY (manufactured by Dow Chemical), ELITE (manufactured by Dow Chemical), ELITE AT (manufactured by Dow Chemical), LUMITAC (manufactured by Tosoh), EXCELLEN FX (manufactured by Sumitomo Chemical), EXCELLEN VL (manufactured by Sumitomo Chemical), Sumikathene E (manufactured by Sumitomo Chemical), NIPOLON Z (manufactured by Tosoh), EVOLUE (manufactured by Prime Polymer), UMERIT (manufactured by UBE-MARUZEN Polyethylene), etc., may be used, for example.

Any anti-blocking agent (AB agent), rustproof agent, anti-oxidant, anti-static agent, workability improving agent or other additives may be added to the layer on the product side (7), as necessary, to the extent that the object and effects of the present invention are not impaired.

It should be noted that adding a rustproof agent to the layer on the product side (7) prevents rusting without using rustproof oil, which eliminates the need to remove rustproof oil after the product has been transported. Furthermore, there is no need to remove foreign matter from the product in this embodiment, because generation of foreign matter due to vibration occurring while the product is transported can be suppressed. As a result, adding a rustproof agent to the layer on the product side (7) makes it no longer necessary to perform post-transport washing, etc., to remove rustproof oil and foreign matter, which makes the film (1) in this embodiment suitable for transporting metal products.

Preferably, however, virtually no tackifier is added to the layer on the product side (7). Here, "virtually no . . . is added" means that the quantity of any tackifier accounts for 0 to 5 parts by mass relative to 100 parts by mass corresponding to the total resin components contained in the layer on the product side (7). The quantity of tackifier is more preferably in a range of 0 to 0.5 part by mass, or most preferably in a range of 0 to 0.1 part by mass. This is because, when virtually no tackifier is added to the layer on the product side (7), foreign matter that would have derived from such tackifier hardly attach to the product (3).

Examples of the tackifier include, but are not limited to, gum rosin, wood rosin, and other rosins, hydrogenated rosin, disproportionated rosin, polymerized rosin, maleated rosin, and other modified rosins, rosin glycerin ester, hydrogenated rosin glycerin ester, and other rosin esters, α-pinene resin, β-pinene resin, dipentene resin, and other terpene resins, aromatic hydrocarbon modified terpene resins, aliphatic petroleum resins, alicyclic petroleum resins, and styrene resins whose primary component is styrene, α-methyl styrene, vinyl toluene, isopropenyl toluene, and the like.

The thickness of the layer on the product side (7) is not limited in any way. From the viewpoint of increasing the following capability of the layer on the product side (7) to follow movement of the product (3), the thickness of the layer on the product side (7) is preferably in a range of 10 to 200 μm, or more preferably in a range of 30 to 180 μm, or most preferably in a range of 50 to 150 μm.

[Packing-Material Side]

In Embodiment 1 of the present invention, the resin that constitutes the layer on the packing-material side (9) is selected in such a way that the dynamic friction force on the face on the packing-material side (1B) becomes lower than the maximum static friction force on the face on the product side (1A), and any of a wide range of resins may be used.

In Embodiment 2 of the present invention, particularly when the product is heavy, any of the materials mentioned below may be selected and used so that the dynamic friction coefficient on the face on the packing-material side (1B) becomes 0.40 or less. It should be noted that, here, there is no need to limit the friction coefficient or friction force on the face on the product side in any way.

In this embodiment, the energy (stress) applied to the film (1) is reduced by improving the slipping between the face on the packing-material side (1B) and the packing material (5).

The resin that constitutes the layer on the packing-material side (9) may be a polyolefin resin, etc., for example.

The density of the polyolefin resin is defined in a range of 0.860 to 0.970 g/cm$^3$; within this range, however, a more preferable range is 0.890 to 0.950 g/cm$^3$. In addition, the MFR (measured under a load of 2.16 kg at 190° C. or 230° C. in accordance with ASTM D1238) of the polyolefin resin, although not limited in any way, is preferably in a range of 0.01 to 150 g/10 min, or more preferably in a range of 0.05 to 50 g/10 min, or most preferably in a range of 0.1 to 20 g/10 min.

The polyolefin resin, which is used as the resin that constitutes the layer on the packing-material side, is an olefin homopolymer and/or a copolymer using an olefin as a monomer. In addition, a polyolefin resin plastomer or polyolefin resin elastomer may also be selected so long as the dynamic friction force on the surface of the layer on the packing-material side (the other face) is 0.80 N or less and also, if necessary, the 1% yield strength of the film is in a range of 0.5 to 12 N.

The olefin (olefin monomer) that constitutes the polyolefin resin may be ethylene, propylene, 1-butene, 3-methyl-1-butene, 1-pentene, 3-methyl-1-pentene, 4-methyl-1-pentene, 1-hexene, 1-octene, or the like. Accordingly, the polyolefin resin may be an ethylene polymer, propylene polymer, 1-butene polymer, 1-hexene polymer, 4-methyl-1-pentene polymer, or the like. Any one of these types of polymers may be used alone, or two or more types may be combined. In other words, the polyolefin resin may be a mixture of various polymers.

Among the above, the ethylene polymer may be an ethylene homopolymer (polyethylene) or a copolymer of ethylene and other polymer (ethylene copolymer). The ethylene homopolymer may be a low-density polyethylene (LDPE), linear low-density polyethylene (L-LDPE), medium-density polyethylene (MDPE), high-density polyethylene (HDPE), or ultra-high molecular weight polyethylene (UHMWPE), for example.

In addition, the ethylene copolymer may be an ethylene-propylene copolymer, ethylene-1-butene copolymer, ethylene-1-pentene copolymer, ethylene-1-hexene copolymer, ethylene-1-octene copolymer, ethylene-4-methyl-1-pentene copolymer, or the like.

It should be noted that, although the ethylene units (constitutional units derived from ethylene) contained in the ethylene copolymer only need be greater than 50% of all constitutional units (normally 99.999% or less), they may account for 80 to 99.999%, or 90 to 99.995%, or more narrowly 99.0 to 99.990%, of all constitutional units, for example.

Additionally, the propylene polymer may be a propylene homopolymer (polypropylene) or a copolymer of propylene and other monomer (propylene copolymer). The propylene copolymer may be a propylene-ethylene copolymer, propylene-1-butene copolymer, propylene-1-pentene copolymer, propylene-1-octene copolymer, or the like.

To be more specific, PRIME POLYPRO (manufactured by Prime Polymer), NOBLEN (manufactured by Sumitomo Chemical), NOVATEC PP (manufactured by Japan Polypropylene), WINTEC (manufactured by Japan Polypropylene), POLYPROPYLENE SUNALLOMER (manufactured by SunAllomer), etc., may be used, for example.

It should be noted that, although the propylene units (constitutional units derived from propylene) contained in the propylene copolymer only need be 50% or greater of all constitutional units (normally 99.999% or less), they may account for 80 to 99.999%, or 90 to 99.995%, or more narrowly 99.0 to 99.990%, of all constitutional units, for example.

Additionally, the polyolefin polymer may contain constitutional units derived from non-olefin monomers, to the extent that the object of the present invention is not impaired. Examples of non-olefin monomers include unsaturated carboxylic acids (acrylic acid, methacrylic acid, etc.), unsaturated carboxylate esters (methyl acrylate, ethyl acrylate, butyl acrylate, methyl methacrylate, ethyl methacrylate, butyl methacrylate, dimethyl maleate, diethyl maleate, etc.), vinyl esters (vinyl acetates, vinyl propionate, fumaric acid, maleic anhydride, maleic monoester, etc.), and the like. Any one of these types of monomers may be used alone or two or more types may be combined.

It should be noted that, preferably the constitutional units derived from non-olefin monomers, if any, contained in the polyolefin polymer are no more than 40% of all constitutional units (normally 0.001% or more). For example, these constitutional units may account for 0.001 to 25%, or 0.005 to 15%, or more narrowly 0.01 to 10%, of all constitutional units.

The weight-average molecular weight of the polyolefin resin is not limited in any way. For example, it is preferably 50000 or more, or more preferably 60000 or more, and the upper limit is preferably 1000000 or less, or more preferably 600000 or less.

It should be noted that, if multiple polyolefin resins are used, the weight-average molecular weight of the polyolefin resin refers to the value measured for each polyolefin resin.

It should also be noted that several types of polyolefins, each having a different weight-average molecular weight, may be mixed and used as a polyolefin resin.

In this embodiment, preferably the resin that constitutes the layer on the packing-material side (9) is a propylene polymer or ethylene polymer.

Any anti-blocking agent (AB agent), rustproof agent, slip agent, anti-oxidant, anti-static agent, workability improving agent, or other additives may be added to the layer on the packing-material side (9), as necessary, to the extent that the object and effects of the present invention are not impaired.

Among these additives, a slip agent, if added, achieves the operations and effects described below.

In Embodiment 1 of the present invention, it goes without saying that, by selecting a resin constitution, etc., the face on the packing-material side (1B) can be made more slippery or the dynamic friction force on the face on the packing-material side (1B) may be made lower, than the face on the product side (1A), of the film (1). Also, in Embodiment 2 of the present invention, the dynamic friction coefficient is 0.4 or less. However, selecting a resin constitution that achieves the foregoing requires a significant amount of trial and error.

When a slip agent is added to the layer on the packing-material side (9), the face on the packing-material side (1B) of the film (1) can be made especially slippery against the packing material (5), regardless of the characteristics of the resin to be selected.

Also, by using a slip agent, the difference between the maximum static friction force on the face on the product side, and the dynamic friction force on the face on the packing-material side, can be adjusted to 0.30 N or more with ease.

Also by using a slip agent, the dynamic friction force on the face on the packing-material side can be adjusted to 0.80 N or less with ease.

Also, when the product is particularly heavy, any of the materials mentioned below may be selected and used as a slip agent so that the dynamic friction coefficient on the face on the packing-material side (1B) becomes 0.40 or less, or preferably 0.30 or less, or more preferably 0.20 or less.

In other words, a slip agent may be added, as necessary, to prevent scraping, damage, etc., on the packing-material side (1B) of the film (1).

It should be noted that, when the layer on the packing-material side (9) contains a slip agent, it is preferable that virtually no slip agent is contained in the layer on the product side (7).

Here, "virtually no . . . is added" means that the quantity of any slip agent accounts for 0 to 1000 ppm (μg/g) relative to the total resin components contained in the layer on the product side (7).

The slip agent is not limited in any way, and any known aliphatic amide compound, silicone oil, fluorine oil, hydrocarbon compound, aliphatic compound, higher alcohol compound, aliphatic ester compound, etc., may be selected from a wide range of such materials and used.

For the aliphatic amide compound, a saturated aliphatic amide compound or unsaturated aliphatic amide compound is used, for example. The aliphatic amide compound may be erucic acid amide, myristic acid amide, palmitic acid amide, arachidic acid amide, stearic acid amide, behenic acid amide, lignoceric acid amide, oleic acid amide, nervonic acid amide, linoleic acid amide, linolenic acid amide, ethylene bis-octadecane amide, methylene bis-stearic acid amide, ethylene bis-stearic acid amide, arachidonic acid amide, ethylene bis-hydroxy stearic acid amide, ethylene bis-capric acid amide, ethylene bis-caprylic acid amide, etc., for example.

The silicone oil may be dimethyl silicone, methyl phenyl silicone, or other straight silicone oil, amino-modified, epoxy-modified, carbinol-modified, mercapto-modified, carboxyl-modified, methacryl-modified, polyether-modified, phenol-modified, one-terminal-reactive/different-functional-group-modified, or other reactive modified silicone oil, polyether-modified, alkyl-modified, fluoroalkyl modified, long-chain-alkyl-modified, higher-aliphatic-ester-modified, phenyl-modified, or other non-reactive modified silicone oil, etc., for example.

The fluorine oil may be a surface-active agent containing fluoroalkyl group or perfluoroalkyl group, etc., for example.

The hydrocarbon compound may be liquid paraffin, paraffin wax, synthetic polyethylene wax, etc., for example.

The aliphatic compound may be myristic acid, oleic acid, palmitic acid, stearic acid, erucic acid, arachidic acid, behenic acid, lignoceric acid, nervonic acid, linoleic acid, linolenic acid, arachidonic acid, etc., for example.

The higher alcohol compound may be stearyl alcohol, oleyl alcohol, lauryl alcohol, etc., for example.

Among these slip agents, an aliphatic amide compound is preferred, or erucic acid amide or oleic acid amide is more preferred, from the viewpoints of low cost, better slipping against the packing material (5), and suppression of scrapings from generating.

The blending quantity of the slip agent is not limited in any way, but it is preferably in a range of 0.001 to 2.0 parts by mass, or more preferably in a range of 0.01 to 1.5 parts by mass, or most preferably in a range of 0.01 to 1.0 part by mass, relative to 100 parts by mass corresponding to the total resin components contained in the layer on the packing-material side (9). This is because, when the blending quantity of the slip agent is within these ranges, good slipping is achieved between the face on the packing-material side (1B) and the packing material (5), and generation of foreign matter is suppressed as a result.

It should be noted that the slip agent may bleed out from the face on the packing-material side (1B) of the film (1). In other words, the slip agent may seep out onto the surface of the film (1). This is because, when the slip agent bleeds out, good slipping is achieved between the face on the packing-material side (1B) of the film (1) and the packing material (5).

The thickness of the layer on the packing-material side (9) is not limited in any way. From the viewpoint of increasing the strength of the film (1), the thickness of the layer on the packing-material side (9) is preferably in a range of 10 to 190 μm, or more preferably in a range of 30 to 180 μm, or most preferably in a range of 50 to 150 μm.

[Combination of Resin that Constitutes Layer on the Product Side and Resin that Constitutes Layer on the Packing-Material Side]

As described above, various resins are used for the resin that constitutes the layer on the product side and the resin that constitutes the layer on the packing-material side; among these, the following combinations of resins are used in a favorable manner.

Preferably, the resin that constitutes the layer on the product side contains at least one type of resin selected from the group that consists of polypropylene elastomer, polyethylene elastomer, polyolefin elastomer, and other thermoplastic elastomer resins, polyethylene plastomer and other plastomer resins, and linear low-density polyethylene, while the resin that constitutes the layer on the packing-material side contains at least one type of resin selected from the group that consists of ethylene propylene copolymers (random polypropylene, block polypropyrene), homopolypropylene, high-density polyethylene, and linear low-density polyethylene.

It should be noted, however, that, if the resin that constitutes the layer on the product side is of the same type as the resin that constitutes the layer on the packing-material side, a slip agent will be added to the layer on the packing-material side, while virtually no slip agent will be added to the layer on the product side.

It should be noted that the method for manufacturing each resin is not limited in any way, and the continuous method, batch method, solution method, slurry method, gaseous phase method, etc., may be used. The catalyst type is not limited in any way, either, and examples include, but are not limited to, catalysts manufactured using metallocene catalysts, Ziegler catalyst, Phillips catalyst, standard catalysts, and vanadium catalysts.

The metallocene catalysts generally include those catalysts comprising a transition metal compound with a cyclopentadienyl ring of group 4 of the periodic table and a methyl aluminoxane, or a compound that reacts with a transition metal compound of group 4 of the periodic table to form an ionic complex and an organic aluminum compound.

[Method for Manufacturing Product Conveyance Film]

The method for manufacturing the product conveyance film (1) is not limited in any way, and any method may be selected as deemed appropriate according to the type of film. For example, the extrusion method, lamination method, coating method, etc., may be adopted. From the viewpoint of preventing glue or other foreign matter from attaching, the extrusion method that does not use glue, etc., is preferred.

[Effects of Product Conveyance Film in this Embodiment]

The product conveyance film (1) in this embodiment is such that the maximum static friction force on the face on the product side (1A) is greater than the dynamic friction force on the face on the packing-material side (1B). When this film (1) is used to transport a part or other product (3), the following operations and effects are achieved. To be specific, the product (3) and the film (1) remain in contact with or follow each other and move roughly as one, even when vibration occurs during transport, and this prevents the film (1) from being shaved by the product (3). As a result, the product (3) becomes less susceptible to attachment of scrapings.

In addition, the film (1) and the packing material (5) slip against each other easily even when vibration occurs during transport. Accordingly, the film (1) does not break easily, which prevents attachment of broken pieces of the film (1) to the product (3). It also prevents scraping of the packing material (5), which would otherwise be caused by the product (3) making direct contact with the packing material (5) due to breaking of the film (1).

Additionally, in Embodiment 1 of the present invention, foreign matter such as powder, in particular, does not generate easily due to vibration during transport, because the difference between the maximum static friction force on the face on the product side (1A) and the dynamic friction force on the face on the packing-material side (1B) is 0.30 N or more, and also because the dynamic friction force on the face on the packing-material side (1B) is 0.8 N or less.

Additionally, when the product conveyance film (1) comprises at least two layers, the maximum static friction force on the face on the product side (1A), and the dynamic friction force on the face on the packing-material side (1B), can be adjusted with ease. Also, the foregoing facilitates the manufacturing process using any existing co-extrusion film-forming machine or other facility.

Also, when the Martens hardness of the layer on the product side is 50 N/mm$^2$ or less, the film follows movement of the product easily and foreign matter such as powder, in particular, does not generate easily due to vibration during transport.

In Embodiment 2 of the present invention, particularly when the product is heavy, adjusting the Martens hardness of the face on the product side to 50 N/mm$^2$ or less, the dynamic friction coefficient of the face on the packing-material side to 0.40 or less, and the 1% yield strength of the product conveyance film to a range of 0.5 to 12 N, ensures that the heavy product being transported, etc., slips as one with the film against the surface of the packing material, without the film stretching, and eventually tearing, etc., due to the weight of the product.

Also, in Embodiments 1 and 2 of the present invention, adjusting the yield strength of the film to a specified level adds elastic recovery property to the film, and this effectively prevents generation of foreign matter due to tearing and damage of the film caused by stretching under vibration during transport.

Also, the foregoing also adds a certain level of rigidity to the film, and accordingly the following operations and effects are achieved.

If the film rigidity is too high, the film loses its ability to follow movement of the product under vibration during transport, and consequently the product rubs against the film and the film is shaved off near the surface, and foreign matter generates as a result. If the film has the specific yield strength described in this embodiment, on the other hand, such generation of foreign matter can be effectively prevented.

Also, when a slip agent is added to the layer on the packing-material side (9), the face on the packing-material side (1B) of this film (1) becomes particularly slippery against the packing material (5). This effectively prevents scraping, damage, etc., on the packing-material side of the film (1).

Also, when no tackifier is added to the layer on the product side (7), there is little possibility that foreign matter derived from such additive deposit onto the face on the product side (1A), which means that foreign matter hardly attaches to the product (3).

It should be noted that the symbols in parentheses used in each constitution described in the aforementioned embodiments show the corresponding relationships with the specific constitutions described in the examples below.

EXAMPLES

The present invention is explained more specifically below using examples.

[1] Preparation of Film

Example 1

To form a two-material, two-layer coextrusion film, the materials for two layers were prepared as follows.

As the resin composition to constitute the layer on the product side 7, a resin composition prepared by thoroughly mixing and kneading 100 parts by mass of a polypropylene elastomer [density: 0.886 g/cm$^3$, MFR: 7.0 (230° C.)] was prepared.

As the resin composition to constitute the layer on the packing-material side 9, a resin composition prepared by thoroughly mixing and kneading 100 parts by mass of a random polypropylene [density: 0.910 g/cm$^3$, MFR: 7.0 (230° C.)] was prepared.

Using a two-material, two-layer coextrusion film-forming machine, the resin composition to constitute the layer on the product side 7, and the resin composition to constitute the layer on the packing-material side 9, were coextruded to a thickness of 40 μm and a thickness of 40 μm, respectively, to manufacture a film 1 of 80 μm in total thickness.

Example 2

To form a two-material, two-layer coextrusion film, the materials for two layers were prepared as follows.

As the resin composition to constitute the layer on the product side 7, a resin composition prepared by thoroughly mixing and kneading 100 parts by mass of a metallocene linear low-density polyethylene [density: 0.912 g/cm$^3$, MFR: 3.7 (190° C.)] was prepared.

As the resin composition to constitute the layer on the packing-material side 9, a resin composition prepared by thoroughly mixing and kneading 100 parts by mass of a metallocene linear low-density polyethylene [density: 0.912 g/cm$^3$, MFR: 3.7 (190° C.)], and 2.0 parts by mass of an erucic acid amide (2% content, masterbatch) as a slip agent, was prepared.

Using a two-material, two-layer coextrusion film-forming machine, the resin composition to constitute the layer on the product side 7, and the resin composition to constitute the layer on the packing-material side 9, were coextruded to a thickness of 50 μm and a thickness of 50 μm, respectively, to manufacture a film 1 of 100 μm in total thickness.

Example 3

A film 1 was obtained in the same manner as in Example 2, except that the following composition was used as the resin composition to constitute the layer on the packing-material side 9.

As the resin composition to constitute the layer on the packing-material side 9, a resin composition prepared by thoroughly mixing and kneading 100 parts by mass of a metallocene linear low-density polyethylene [density: 0.912 g/cm$^3$, MFR: 3.7 (190° C.)], and 5.0 parts by mass of an erucic acid amide (2% content, masterbatch) as a slip agent, was prepared.

Example 4

A film 1 was obtained according to the same constitution as in Example 3, and in the same manner as in Example 3, except that the following composition was used as the resin composition to constitute the layer on the product side 7.

As the resin composition to constitute the layer on the product side 7, a resin composition prepared by thoroughly mixing and kneading 100 parts by mass of a metallocene linear low-density polyethylene [density: 0.912 g/cm$^3$, MFR: 3.7 (190° C.)], and 6.0 parts by mass of a sodium nitrite (5% content, masterbatch) as a rustproof agent, was prepared.

Example 5

A film 1 was obtained in the same manner as in Example 4, except that the resin composition to constitute the layer on the product side 7, and the resin composition to constitute the layer on the packing-material side 9, were coextruded to a thickness of 75 μm and a thickness of 75 μm, respectively, to a total thickness of 150 μm.

Example 6

A film 1 was obtained in the same manner as in Example 2, except that the following composition was used as the resin composition to constitute the layer on the packing-material side 9.

As the resin composition to constitute the layer on the packing-material side 9, a resin composition prepared by thoroughly mixing and kneading 100 parts by mass of a metallocene linear low-density polyethylene [density: 0.912 g/cm$^3$, MFR: 3.7 (190° C.)], and 10.0 parts by mass of an erucic acid amide (2% content, masterbatch) as a slip agent, was prepared.

Example 7

To form a two-material, two-layer coextrusion film, the materials for two layers were prepared as follows.

As the resin composition to constitute the layer on the product side 7, a resin composition prepared by thoroughly mixing and kneading 100 parts by mass of a polyethylene elastomer [density: 0.879 g/cm$^3$, MFR: 5.0 (190° C.)] was prepared.

As the resin composition to constitute the layer on the packing-material side 9, a resin composition prepared by thoroughly mixing and kneading 100 parts by mass of a metallocene linear low-density polyethylene [density: 0.925 g/cm$^3$, MFR: 1.1 (190° C.)], and 5.0 parts by mass of an erucic acid amide (2% content, masterbatch) as a slip agent, was prepared.

Using a two-material, two-layer coextrusion film-forming machine, the resin composition to constitute the layer on the product side 7, and the resin composition to constitute the layer on the packing-material side 9, were coextruded to a thickness of 40 μm and a thickness of 40 μm, respectively, to manufacture a film 1 of 80 μm in total thickness.

Example 8

A film 1 was obtained according to the same constitution as in Example 7, and in the same manner as in Example 7, except that the following composition was used as the resin composition to constitute the layer on the product side 7.

As the resin composition to constitute the layer on the product side 7, a resin composition prepared by thoroughly mixing and kneading 50 parts by mass of a polyethylene elastomer [density: 0.879 g/cm$^3$, MFR: 5.0 (190° C.)], and 50 parts by mass of a polyethylene plastomer [density: 0.890 g/cm$^3$, MFR: 3.8 (190° C.)], was prepared.

Example 9

A film 1 was obtained according to the same constitution as in Example 7, and in the same manner as in Example 7, except that the following composition was used as the resin composition to constitute the layer on the product side 7.

As the resin composition to constitute the layer on the product side 7, a resin composition prepared by thoroughly mixing and kneading 100 parts by mass of a metallocene linear low-density polyethylene [density: 0.912 g/cm$^3$, MFR: 3.7 (190° C.)], was prepared.

Example 10

A film 1 was obtained according to the same constitution as in Example 7, and in the same manner as in Example 7, except that the following composition was used as the resin composition to constitute the layer on the product side 7.

As the resin composition to constitute the layer on the product side 7, a resin composition prepared by thoroughly mixing and kneading 100 parts by mass of a metallocene linear low-density polyethylene [density: 0.925 g/cm$^3$, MFR: 1.1 (190° C.)], was prepared.

Example 11

A film 1 was obtained according to the same constitution as in Example 1, and in the same manner as in Example 1, except that the following composition was used as the resin composition to constitute the layer on the packing-material side 9.

As the resin composition to constitute the layer on the packing-material side 9, a resin composition prepared by thoroughly mixing and kneading 100 parts by mass of a metallocene random polypropylene [density: 0.900 g/cm$^3$, MFR: 7.0 (230° C.)], and 5.0 parts by mass of an erucic acid amide (2% content, masterbatch) as a slip agent, was prepared.

Example 12

A film 1 was obtained according to the same constitution as in Example 1, and in the same manner as in Example 1, except that the following composition was used as the resin composition to constitute the layer on the packing-material side 9.

As the resin composition to constitute the layer on the packing-material side 9, a resin composition prepared by thoroughly mixing and kneading 100 parts by mass of a random polypropylene [density: 0.910 g/cm$^3$, MFR: 7.0 (230° C.)], and 5.0 parts by mass of an erucic acid amide (2% content, masterbatch) as a slip agent, was prepared.

Example 13

A film 1 was obtained according to the same constitution as in Example 12, and in the same manner as in Example 12, except that the following composition was used as the resin composition to constitute the layer on the product side 7.

As the resin composition to constitute the layer on the product side 7, a resin composition prepared by thoroughly mixing and kneading 40 parts by mass of a polypropylene elastomer [density: 0.886 g/cm$^3$, MFR: 7.0 (230° C.)], and 60 parts by mass of a random polypropylene [density: 0.910 g/cm$^3$, MFR: 7.0 (230° C.)], was prepared.

Comparative Example 1

To form a single-layer extrusion film, the material was prepared as follows.

As the resin composition to constitute the film, a resin composition prepared by thoroughly mixing and kneading 100 parts by mass of a metallocene linear low-density polyethylene [density: 0.912 g/cm$^3$, MFR: 3.7 (190° C.)] was prepared.

A single-layer extrusion film-forming machine was used to manufacture a film 1 of 100 μm in total thickness.

Comparative Example 2

A film 1 was obtained in the same manner as in Example 1, except that the following compositions were used as the resin composition to constitute the layer on the product side 7 and the resin composition to constitute the layer on the packing-material side 9.

As the resin composition to constitute the layer on the product side 7, a resin composition prepared by thoroughly mixing and kneading 100 parts by mass of a high-density polyethylene [density: 0.954 g/cm$^3$, MFR: 1.1 (190° C.)], was prepared.

As the resin composition to constitute the layer on the packing-material side 9, a resin composition prepared by thoroughly mixing and kneading 100 parts by mass of a metallocene linear low-density polyethylene [density: 0.925 g/cm$^3$, MFR: 1.1 (190° C.)], and 5.0 parts by mass of an erucic acid amide (2% content, masterbatch) as a slip agent, was prepared.

Comparative Example 3

A film 1 was obtained in the same manner as in Example 1, except that the following compositions were used as the resin composition to constitute the layer on the product side 7 and the resin composition to constitute the layer on the packing-material side 9.

As the resin composition to constitute the layer on the product side 7, a resin composition prepared by thoroughly mixing and kneading 50 parts by mass of a polyethylene elastomer [density: 0.879 g/cm$^3$, MFR: 5.0 (190° C.)], and 50 parts by mass of a polyethylene plastomer [density: 0.890 g/cm$^3$, MFR: 3.8 (190° C.)], was prepared.

As the resin composition to constitute the layer on the packing-material side 9, a resin composition prepared by thoroughly mixing and kneading 50 parts by mass of a polyethylene elastomer [density: 0.879 g/cm$^3$, MFR: 5.0 (190° C.)], 50 parts by mass of a polyethylene plastomer

[density: 0.890 g/cm³, MFR: 3.8 (190° C.)], and 5.0 parts by mass of an erucic acid amide (2% content, masterbatch) as a slip agent, was prepared.

Comparative Example 4

A film 1 was obtained in the same manner as in Example 1, except that the following compositions were used as the resin composition to constitute the layer on the product side 7 and the resin composition to constitute the layer on the packing-material side 9.

As the resin composition to constitute the layer on the product side 7, a resin composition prepared by thoroughly mixing and kneading 100 parts by mass of a random polypropylene [density: 0.910 g/cm³, MFR: 7.0 (230° C.)] was prepared.

As the resin composition to constitute the layer on the packing-material side 9, a resin composition prepared by thoroughly mixing and kneading 100 parts by mass of a random polypropylene [density: 0.910 g/cm³, MFR: 7.0 (230° C.)], and 5.0 parts by mass of an erucic acid amide (2% content, masterbatch) as a slip agent, was prepared.

[2] Measurement of Friction Force

The maximum static friction force and dynamic friction force of the film 1 were measured in accordance with JIS K7125. Here, the maximum static friction force on the face on the product side 1A, and the dynamic friction force on the face on the packing-material side 1B, were measured, respectively.

To be more specific, the measurement was performed under the conditions specified below. It should be noted that, when the friction force was high and the dynamic friction force was discontinuous, the measurement was performed by changing the spring to a coupling part.

Tester: Tensile tester (TG-5KN manufactured by Minebea)
Temperature: 23±2° C.
Humidity: 50±6% RH
Test piece: 80 mm wide, 200 mm long
Slipping piece: 200 g±2 g
Mating material: Film on film (Product side: Inner face/inner face, Packing-material side: Outer face/outer face)
Test speed: 100 mm/min±10 mm/min

[3] Measurement of Dynamic Friction Coefficient

The value of dynamic friction force obtained according to "Measurement of Friction Force" above was divided by the weight of the slipping piece, and the resulting value was taken as the dynamic friction coefficient.

[4] Measurement of Martens Hardness

The Martens hardness HM of the layer on the product side 7 was measured in accordance with the instrumented indentation test under ISO 14577.

To be more specific, the measurement was performed under the following conditions.

Tester: Nano-indentation tester (ENT-2100 manufactured by Elionix)
Temperature: 26±2° C.
Humidity: 50±6% RH
Control method: Load control
Maximum load: 5 mN
Load application speed: 0.47 mN/sec
Holding time: 1000 msec
Load removal time: 10000 msec

[5] 1% Yield Strength Test

The 1% yield strength of the film 1 was measured in accordance with JIS K7127.

To be more specific, the measurement was performed under the following conditions, and the value of stress applied to the film 1 when the distance between the chucks had increased 1% from the initial distance, was taken.

Tester: Tensile tester (AG-IS manufactured by Shimadzu)
Temperature: 23±2° C.
Humidity: 50±6% RH
Type of test piece: 2 (Width: 15 mm, Initial distance between chucks: 100 mm)
Test speed: 50 mm/min

[6] Vibration Test

A crank (weight: 18 kg) was used as a product 3, and dunnage was used as packing material. The product 3 was enclosed in the dunnage with the film 1 laid above and below the product, after which a weight of 18 kg was placed further on top, and the entire assembly was fixed to the frame of the vibration tester and vibration testing was conducted. It should be noted that the layer denoted by 7 was placed on the product side, while the layer denoted by 9 was placed on the dunnage side.

After the vibration test (5 minutes=1 cycle) was conducted for three and five cycles consecutively, the crank was visually observed for attachment of foreign matter.

Tester: Vibration tester (BF-100UT manufactured by Idexx)
Test condition: 1 cycle consists of cycling between 10 and 40 Hz over 5 minutes (gradually increase the number of vibrations from 10 Hz over 2.5 minutes to reach 40 Hz→gradually decrease the number of vibrations over 2.5 minutes to return to 10 Hz) (Maximum acceleration: 3.0 G).

The result was evaluated at two levels as specified below.

<Evaluation>

○: No foreign matter is attached to the crank.

X: Attachment of foreign matter is visible on the crank.

The constitutions of the films in the examples and comparative examples are shown in Tables 1 and 2.

TABLE 1

| Example | Thickness (μm) | Layer constitution | Resin on product side (parts by mass) | Density (g/cm³) | Rustproof agent (%) | Resin on the packing-material side (parts by mass) | Density (g/cm³) | Slip agent (%) |
|---|---|---|---|---|---|---|---|---|
| 1 | 80 | 2 layers | Polypropylene elastomer (100) | 0.886 | 0 | Random polypropylene (100) | 0.91 | 0 |
| 2 | 100 | 2 layers | Metallocene linear low-density polyethylene (100) | 0.912 | 0 | Metallocene linear low-density polyethylene (100) | 0.912 | 0.04 |
| 3 | 100 | 2 layers | Metallocene linear low-density polyethylene (100) | 0.912 | 0 | Metallocene linear low-density polyethylene (100) | 0.912 | 0.1 |

TABLE 1-continued

| Example | Thickness (μm) | Layer constitution | Resin on product side (parts by mass) | Density (g/cm$^3$) | Rustproof agent (%) | Resin on the packing-material side (parts by mass) | Density (g/cm$^3$) | Slip agent (%) |
|---|---|---|---|---|---|---|---|---|
| 4 | 100 | 2 layers | Metallocene linear low-density polyethylene (100) | 0.912 | 0.3 | Metallocene linear low-density polyethylene (100) | 0.912 | 0.1 |
| 5 | 150 | 2 layers | Metallocene linear low-density polyethylene (100) | 0.912 | 0.3 | Metallocene linear low-density polyethylene (100) | 0.912 | 0.1 |
| 6 | 100 | 2 layers | Metallocene linear low-density polyethylene (100) | 0.912 | 0 | Metallocene linear low-density polyethylene (100) | 0.912 | 0.2 |
| 7 | 80 | 2 layers | Polyethylene elastomer (100) | 0.879 | 0 | Metallocene linear low-density polyethylene (100) | 0.925 | 0.1 |
| 8 | 80 | 2 layers | Polyethylene elastomer (50) + Polyethylene plastomer (50) | 0.884 | 0 | Metallocene linear low-density polyethylene (100) | 0.925 | 0.1 |
| 9 | 80 | 2 layers | Metallocene linear low-density polyethylene (100) | 0.912 | 0 | Metallocene linear low-density polyethylene (100) | 0.925 | 0.1 |
| 10 | 80 | 2 layers | Metallocene linear low-density polyethylene (100) | 0.925 | 0 | Metallocene linear low-density polyethylene (100) | 0.925 | 0.1 |
| 11 | 80 | 2 layers | Polypropylene elastomer (100) | 0.886 | 0 | Metallocene random polypropylene (100) | 0.9 | 0.1 |
| 12 | 80 | 2 layers | Polypropylene elastomer (100) | 0.886 | 0 | Random polypropylene (100) | 0.91 | 0.1 |
| 13 | 80 | 2 layers | Polypropylene elastomer (40) + Random polypropylene (60) | 0.9 | 0 | Random polypropylene (100) | 0.91 | 0.1 |

TABLE 2

| Comparative Example | Thickness (μm) | Layer constitution | Resin on product side (parts by mass) | Density (g/cm$^3$) | Rustproof agent (%) | Resin on the packing-material side (parts by mass) | Density (g/cm3) | Slip agent (%) |
|---|---|---|---|---|---|---|---|---|
| 1 | 100 | 1 layer | | | | Metallocene linear low-density polyethylene (100) | 0.912 | 0 |
| 2 | 80 | 2 layers | High-density polyethylene (100) | 0.954 | 0 | Metallocene linear low-density polyethylene (100) | 0.925 | 0.1 |
| 3 | 80 | 2 layers | Polyethylene elastomer (50) + Polyethylene plastomer (50) | 0.884 | 0 | Polyethylene elastomer (50) + Polyethylene plastomer (50) | 0.884 | 0.1 |
| 4 | 80 | 2 layers | Random polypropylene (100) | 0.91 | 0 | Random polypropylene (100) | 0.91 | 0.1 |

TABLE 3

| | Vibration test | | Face 1A A Maximum static friction force (N) | Face 1B B Dynamic friction force (N) | A-B (N) | Face 1B Dynamic friction coefficient | Layer 7 Martens hardness (N/mm$^2$) | Film 1 1% yield strength (N) |
|---|---|---|---|---|---|---|---|---|
| | 3 cycles | 5 cycles | | | | | | |
| Example 1 | ◯ | X | 2.00 | 0.80 | 0.60 | 0.40 | 22 | 9.1 |
| Example 2 | ◯ | X | 2.00 | 0.79 | 1.21 | 0.40 | 10 | 1.6 |
| Example 3 | ◯ | ◯ | 2.00 | 0.34 | 1.66 | 0.17 | 10 | 1.8 |
| Example 4 | ◯ | ◯ | 0.86 | 0.34 | 0.52 | 0.17 | 13 | 2.3 |
| Example 5 | ◯ | ◯ | 0.86 | 0.34 | 0.52 | 0.17 | 13 | 3.5 |
| Example 6 | ◯ | ◯ | 2.00 | 0.22 | 1.78 | 0.11 | 10 | 2.2 |

TABLE 3-continued

| | Vibration test | | Face 1A A Maximum static friction force (N) | Face 1B B Dynamic friction force (N) | A-B (N) | Face 1B Dynamic friction coefficient | Layer 7 Martens hardness (N/mm$^2$) | Film 1 1% yield strength (N) |
|---|---|---|---|---|---|---|---|---|
| | 3 cycles | 5 cycles | | | | | | |
| Example 7 | ○ | X | 2.00 | 0.40 | 1.60 | 0.20 | 3 | 2.6 |
| Example 8 | ○ | ○ | 2.00 | 0.40 | 1.60 | 0.20 | 5 | 2.7 |
| Example 9 | ○ | ○ | 2.00 | 0.40 | 1.60 | 0.20 | 10 | 2.9 |
| Example 10 | ○ | X | 1.27 | 0.40 | 0.87 | 0.20 | 21 | 3.7 |
| Example 11 | ○ | ○ | 2.00 | 0.34 | 1.62 | 0.19 | 22 | 5.5 |
| Example 12 | ○ | ○ | 2.00 | 0.38 | 1.74 | 0.13 | 22 | 9.1 |
| Example 13 | ○ | X | 1.60 | 0.26 | 1.34 | 0.13 | 47 | 11 |
| Comparative Example 1 | X | X | 2.00 | 1.50 | 0.50 | 0.77 | 10 | 1.4 |
| Comparative Example 2 | X | X | 0.62 | 0.40 | 0.22 | 0.20 | 55 | 4.5 |
| Comparative Example 3 | X | X | 2.00 | 1.00 | 1.00 | 0.51 | 5 | 0.4 |
| Comparative Example 4 | X | X | 1.05 | 0.26 | 0.79 | 0.13 | 79 | 13 |

It was found that, in all of the examples, generation of foreign matter was suppressed compared to the comparative examples.

It was found that, when the difference between the maximum static friction force on the face on the product side (inner layer face) and the dynamic friction force on the face on the packing-material side (outer layer face) was 0.30 N or more, and the dynamic friction force on the face on the packing-material side was 0.80 N or less, generation of foreign matter was suppressed very effectively.

In addition, it was found that, when the Martens hardness of the layer on the product side was 50 N/mm$^2$ or less, generation of foreign matter was suppressed very effectively.

In addition, it was found that, when the 1% yield strength of the film was in a range of 0.5 to 12 N, generation of foreign matter was suppressed very effectively.

In addition, scraping, damage, etc., on the dunnage side of the film were prevented effectively when a slip agent was added to the layer on the packing-material side.

[7] Weight-Specific Vibration Test

Testing was conducted on Comparative Example 4 according to the same method as the aforementioned vibration test.

It should be noted that the testing was conducted by changing the product to each of the products 3 listed in the table below.

<Evaluation>
○: No foreign matter is attached to the product.
X: Attachment of foreign matter is visible on the product.

TABLE 4

| | Weight | Area | Contact pressure | Comparative Example 4 | |
|---|---|---|---|---|---|
| Product | (kg) | (mm$^2$) | (kg/cm$^2$) | 3 cycles | 5 cycles |
| Gear | 1.7 | 4270 | 0.04 | ○ | X |
| Metal corner piece | 0.6 | 4800 | 0.01 | ○ | ○ |
| Metal corner piece | 1 | 4800 | 0.02 | ○ | ○ |
| Metal corner piece | 2.2 | 4800 | 0.05 | X | X |
| Camshaft | 2 | 532 | 0.38 | X | X |
| Brake pad | 4 | 678 | 0.59 | X | X |
| Brake pad | 13 | 3297 | 0.39 | X | X |
| Crank | 18 | 1257 | 1.43 | X | X |
| Engine block | 30 | 574 | 5.23 | X | X |

As these results show, foreign matter did not attach to the product after three or five vibration cycles, even when the film in Comparative Example 4 was used, so long as the product was light (0.6 to 1.7 kg) and the contact pressure was low (0.01 to 0.04 kg/cm$^2$). When the product was heavy and the contact pressure was high, on the other hand, foreign matter attached after three vibration cycles in all cases.

As is evident from the test results, the aforementioned examples according to the present invention were clearly different from the film in Comparative Example 4 above, in that they could prevent foreign matter from attaching to the product even when the product was heavy.

Other Examples

Although the aforementioned examples were explained using a two-layer film 1, it goes without saying that a film 1 comprising three or more layers can be used.

Also, the face on the packing-material side 1B of the film 1 may be plain or it may have an embossed pattern, satin finished pattern, etc. When this face has an embossed pattern, satin finished pattern, etc., the packing material 5 slips easily against the film 1, and therefore the vibration energy is diffused and the film 1 becomes resistant to breaking.

Also, the face on the product side 1A of the film 1 may be processed using a laser, etc. Heating the face on the product side 1A of the film 1 with a laser, etc., makes it easy for the product 3 to contact or adhere to the film 1, which in turn makes the film 1 resistant to scraping by the product 3.

Also, the face on the product side 1A of the film 1 may be given corona treatment. Irradiating with corona discharge reforms the face on the product side 1A and makes it easy for the product 3 to contact or adhere to the film 1, which in turn makes the film 1 resistant to scraping by the product 3.

Also, the face on the packing-material side 1B of the film 1 may be given silicone or other coating treatment. Applying such coating treatment makes it easy for the film 1 to slip against the packing material 5, and therefore the vibration energy is diffused and the film 1 becomes resistant to breaking.

The aforementioned examples are provided only for the purpose of explanation, and should not be interpreted as limiting the present invention in any way. The present invention was explained using examples of typical embodiments; however, the words and expressions used in the descriptions and figures of the present invention are understood as not limiting, but are explanative and illustrative, in nature. As described in detail herein, changes can be added to the modes of carrying out the present invention, so long as doing so does not deviate from the scope and essence of the present invention. It should be noted that the specific structures, materials, and examples referenced herein to describe the present invention in detail are not intended, in any way, to limit the present invention to the matters disclosed herein.

INDUSTRIAL FIELD OF APPLICATION

The present invention is applied to a wide range of product conveyance films for transporting products using vehicles, railway, vessels, aircraft, etc.

What is claimed is:

1. A product conveyance film which is constituted by at least two layers each comprising a polyolefin resin, and which is adapted to be placed between a product and a packing material in which the product is enclosed, said at least two layers including a layer on the product side and a layer on the packing-material side, wherein:
    a Martens hardness of the product-side layer is 50 N/mm$^2$ or less;
    a maximum static friction force on a face of the product-side layer on the product side is greater than a dynamic friction force on a face of the packing-material-side layer on the packing-material side, and a difference between the two forces is 0.30 N or more;
    both the face of the product-side layer and the face of the packing-material-side layer comprise the polyolefin resin; and
    the dynamic friction force on the face on the packing-material side is 0.80 N or less.

2. The product conveyance film according to claim 1, wherein:
    all layers of the at least two layers of the product conveyance film comprise a polyolefin resin; and
    a yield strength of the product conveyance film when stretched by 1% is in a range of 0.5 to 12.0 N.

3. The product conveyance film according to claim 1, wherein:
    all layers of the at least two layers of the product conveyance film comprise a polyolefin resin; and
    a slip agent of the product conveyance film is added to a layer on the packing-material side.

4. The product conveyance film according to claim 1, wherein virtually no tackifier is added to the layer on the product side of the product conveyance film.

5. The product conveyance film according to claim 2, wherein:
    all layers of the at least two layers of the product conveyance film comprise a polyolefin resin; and
    a slip agent of the product conveyance film is added to a layer on the packing-material side.

6. The product conveyance film according to claim 2, characterized in that virtually no tackifier is added to the layer on the product side of the product conveyance film.

7. A product conveyance film, wherein:
    a Martens hardness of one face of the film is 50 N/mm$^2$ or less;
    a dynamic friction coefficient of another face of the film is 0.40 or less;
    a 1% yield strength of the film is in a range of 0.5 to 12.0 N; and
    both the one face and the another face include a polyolefin resin.

8. A product conveyance film, wherein:
    a Martens hardness of one face of the film is in a range of 4 to 25 N/mm$^2$;
    a dynamic friction coefficient of another face of the film is in a range of 0.10 to 0.20;
    a 1% yield strength of the film is in a range of 1.5 to 10.0 N; and
    both the one face and the another face include a polyolefin resin.

9. The product conveyance film according to claim 7, characterized by comprising at least two layers.

10. The product conveyance film according to claim 7, characterized in that virtually no tackifier is added to a layer on the one face side of the product conveyance film.

11. The product conveyance film according to claim 7, characterized in that a maximum static friction force on the one face is greater than a dynamic friction force on the other face, and a difference between the two forces is 0.30 N or more.

12. The product conveyance film according to claim 7, characterized in that the film is placed between a product of 0.05 kg/cm$^2$ or more in contact pressure and a packing material in which the product is enclosed, wherein one face is placed on the product side, and another face is placed on the packing-material side.

13. The product conveyance film according to claim 8, characterized by comprising at least two layers.

14. The product conveyance film according to claim 8, characterized in that virtually no tackifier is added to a layer on the one face side of the product conveyance film.

15. The product conveyance film according to claim 8, characterized in that a maximum static friction force on the one face is greater than a dynamic friction force on the other face, and a difference between the two forces is 0.30 N or more.

16. The product conveyance film according to claim 8, characterized in that the film is placed between a product of 0.05 kg/cm$^2$ or more in contact pressure and a packing material in which the product is enclosed, wherein one face is placed on the product side, and another face is placed on the packing-material side.

\* \* \* \* \*